US005742651A

United States Patent [19]

Anderson

[11] Patent Number: 5,742,651
[45] Date of Patent: Apr. 21, 1998

[54] METHOD OF INCREASING DEPLETION CAPACITY OF A CONTROL ROD FOR A NUCLEAR REACTOR

[75] Inventor: Michael J. Anderson, Wilmington, N.C.

[73] Assignee: General Electric Company, Schenectady, N.Y.

[21] Appl. No.: 617,065

[22] Filed: Mar. 18, 1996

[51] Int. Cl.⁶ .................................. G21C 7/00; G21C 7/24
[52] U.S. Cl. ........................ 376/260; 376/327; 376/333
[58] Field of Search ..................................... 376/327, 333, 376/260

[56] References Cited

U.S. PATENT DOCUMENTS

| 2,861,035 | 11/1958 | Zinn et al. | 376/327 |
| 3,261,760 | 7/1966 | Manoll | 376/327 |
| 3,834,986 | 9/1974 | Suvanto | 376/327 |
| 4,576,787 | 3/1986 | Alsop et al. | 376/327 |
| 4,678,628 | 7/1987 | Freeman | 376/333 |
| 4,683,107 | 7/1987 | Baro et al. | 376/260 |
| 4,728,487 | 3/1988 | Cooney et al. | 376/327 |

FOREIGN PATENT DOCUMENTS

| 0296954 | 12/1988 | European Pat. Off. | 376/327 |
| 0338772 | 10/1989 | European Pat. Off. | 376/327 |
| 0195492 | 10/1985 | Japan | 376/333 |

*Primary Examiner*—Harvey E. Behrend
*Attorney, Agent, or Firm*—Nixon & Vanderhye

[57] ABSTRACT

The control rod for a nuclear reactor includes a plurality of wings each having segments of neutron absorbing material exposed along the length of the rod. During refueling, the segments of neutron absorbing material are rearranged within the control rod and the control rod is reinserted into the reactor core. By rearranging the segments, optimum use of the depletion capacity of each segment is effected, maximizing the number of cycles for which the control rod may be used.

5 Claims, 3 Drawing Sheets

BEFORE/AFTER ROTATION

Depletion Profiles with Unrealized Depletion Capability

METHOD OF INCREASING DEPLETION CAPACITY OF A CONTROL ROD FOR A NUCLEAR REACTOR

TECHNICAL FIELD

The present invention relates to a control rod for a nuclear reactor and particularly to a method for increasing the depletion capacity of the control rod to maximize the number of refueling cycles for which the rod may be used.

BACKGROUND

Control rods are employed in nuclear reactors to perform dual functions of power distribution shaping and reactivity control. Power distribution in the core is controlled during operation of the reactor by manipulation of selected patterns of rods which enter from the bottom of the reactor core. Each control rod in its power distribution function may experience a similar or a very different neutron exposure than other control rods in the control system. Control rods are generally cruciform in cross-section and typically comprise a plurality of tubes extending axially in each wing of the rod. In one design, the tubes are filled with boron carbide powder and seal-welded at their ends with end plugs. The powder is separated into sections or segments. In another design, the tubes are filled with capsules of discrete lengths containing the boron carbide powder. That is, a plurality of capsules are stacked in each tube with the tubes lying side-by-side in each wing of the control rod generally in parallel with the long axis of the rod. These capsules or segments, for example, may be in increments of one foot or more. Typically, the top segment is formed of hafnium.

Depletion is the ability of the material within the control rod to absorb neutrons. Control rods accrue depletion non-uniformly. Non-uniform depletion is a result of an inherently non-uniform flux distribution in the reactor core, as well as variations in the extent of insertion of the control rods into the core during nuclear operation. Neutron flux distribution varies in the core along its axial length but also varies unevenly along that length. Changes in the extent of insertion of the control rod, as well as potential poisons within the fuel rods, also alter the neutron flux distribution. The coolant/moderator flow also substantially affects the neutron flux distribution. As a consequence of non-uniform depletion, the wings and specifically the tubes of the control rod may reach their nuclear depletion limit in certain sections before other sections reach their limit. Stated differently, significant depletion capability remains over certain sections of the control rod, while other sections have reached their depletion limit.

DISCLOSURE OF THE INVENTION

In accordance with the present invention, there is provided a method for increasing the depletion capacity of the control rods by exploiting the inherent non-uniform depletion characteristics of the control rods. To accomplish this, the control rod tubes are divided into discrete segments having discrete lengths. For example, capsules of boron carbide of discrete lengths may be disposed within stainless steel tubes forming the wings of the control rod. The capsules define segments which are not necessarily uniform in loading or in length. The segments may be arranged to accommodate a predetermined depletion profile. After operation of the reactor over time, the segments in the control rod have different depletion capacity. The depletion capacity profile for a control rod fully inserted into the core, as compared with a control rod only partially inserted will be substantially different. For example, the deeply inserted control rod includes segments lying at elevations of different neutron flux distribution than corresponding segments of the partially inserted control rod, the latter also having segments outside the core where their neutron absorbing capacity is not significantly diminished. Hence, the capacity for neutron absorption by the different control rods at like, as well as different, axial positions varies over time.

In accordance with the present invention, the accrued depletion of the rods can be determined or a projected depletion ascertained for the period of use and the segments can be reordered or rearranged at periodic reactor refuelings to maximize the number of cycles for which each control rod may be used. That is to say, the Segments during refueling can be relocated along the rod to alter the location of the accumulated depletion within the core. For example, where a segment in a control rod experiences peak depletion over time, that segment can be rearranged and located at a different location along the rod where the rate of depletion is much smaller. Conversely, where a control rod has one or more segments which experience little or no depletion, e.g., full insertion of that segment into the core did not occur, then that segment may be relocated in the core to a location where the anticipated or projected depletion is substantial.

In a preferred embodiment according to the present invention, there is provided a method of increasing the depletion capacity of a control rod for insertion into the core of a nuclear reactor wherein the control rod has neutron-absorbing material disposed in a plurality of discrete segments at respective discrete locations along the length of the control rod, comprising the steps of, after operating the nuclear reactor with the control rod at least partially inserted into the reactor core, rearranging the segments of neutron-absorbing material along the control rod and at least partially reinserting the control rod with the rearranged segments into the reactor core.

In a further preferred embodiment according to the present invention, there is provided a method of increasing the depletion capacity of a control rod for insertion into the core of a nuclear reactor, wherein the control rod has neutron-absorbing material disposed in an absorber section of the control rod, comprising the steps of, after operating the nuclear reactor with the control rod at least partially inserted into the reactor core, inverting the absorber section and neutron-absorbing material therein and at least partially reinserting the control rod with the inverted section and neutron.absorbing material therein into the reactor core.

In a still further preferred embodiment according to the present invention, there is provided a method of increasing the depletion capacity of a control rod for insertion into the core of a nuclear reactor wherein the control rod has neutron-absorbing material disposed in a plurality of discrete segments at respective discrete locations along the length of the control rod, comprising the steps of, after operating the nuclear reactor with the control rod at least partially inserted into the reactor core affording a first axial profile of the depletion, reordering various segments along the control rod to provide a different axial profile of depletion than the first profile upon at least partial reinsertion of the control rod with the reordered segments into the reactor core.

Accordingly, it is a primary object of the present invention to provide a novel and improved method for increasing the depletion capacity of neutron-absorbing material in the control rods of a nuclear reactor.

BEST MODE FOR CARRYING OUT THE INVENTION

Figure 1:
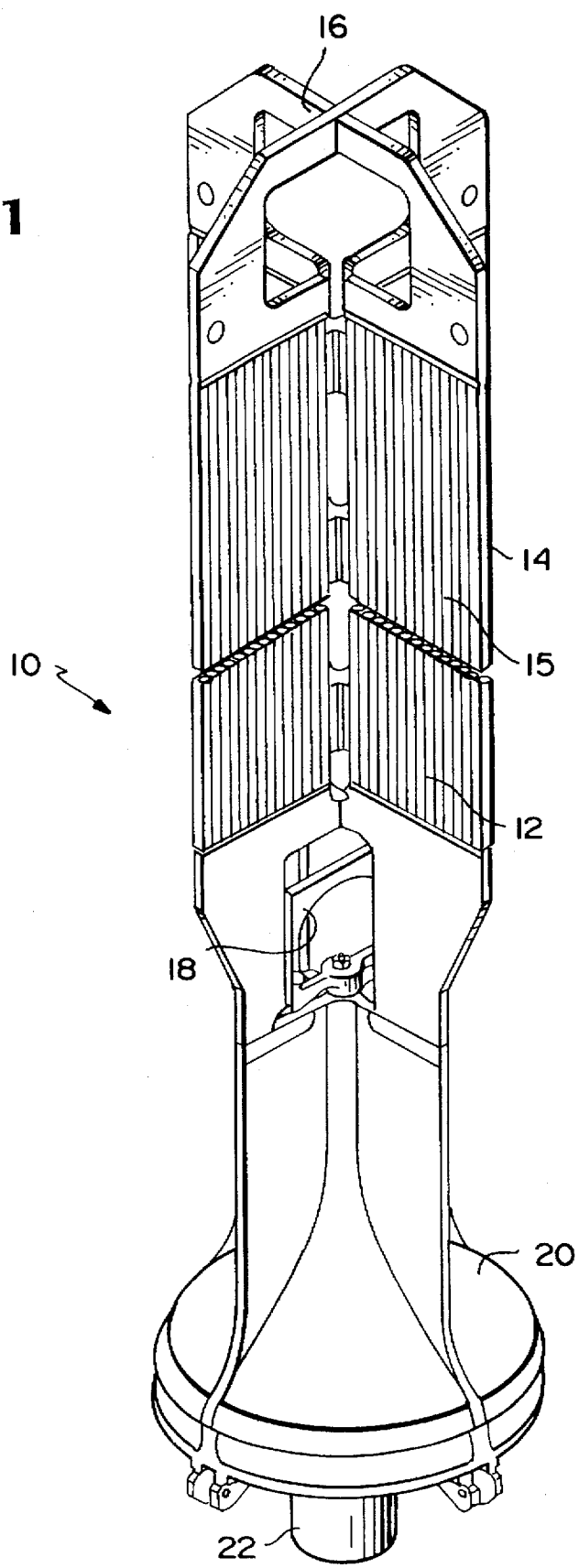
FIG. 1 is a perspective view of a control rod for a nuclear reactor.

Referring now to the drawings, particularly to FIG. 1, there is illustrated a control rod incorporating features of the present invention and generally designated 10. The control rod 10 includes a generally cruciform control rod body 12 with each wing 14 of the cruciform-shaped body 12 including a plurality of elongated tubes 15 extending parallel to the axis of the control rod. The tubes carry neutron-absorbing material, as set forth below. Control rod 10 also includes at its upper end a handle 16, a coupling release handle 18 adjacent its lower end, and a velocity limiter 20 at its lower end, together with a coupling socket 22. It will be appreciated that the control rod is for insertion between fuel channels containing fuel bundles arranged in quadrants such that the perpendicularly related wings of the control rod lie adjacent corresponding sides of a fuel channel.

Figure 2:
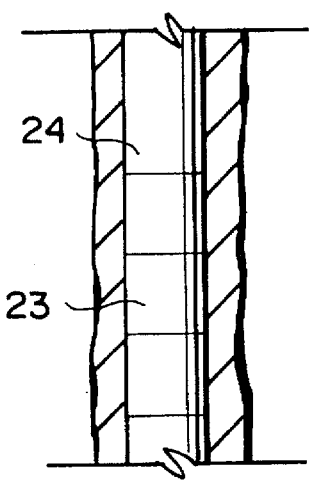
FIG. 2 is a fragmentary cross-sectional view of a plurality of neutron-absorbing segments within a control rod tube.

The tubes 15 contain neutron-absorbing material such as boron carbide. The neutron-absorbing material is provided in discrete segments within each of the multiple tubes in each wing 14 of the cruciform-shaped control rod 10. Thus, for example, and with reference to FIG. 2, the tubes may contain a plurality of capsules 23 of the same or different lengths. Each capsule may contain the boron carbide material in powder form. Typically, the upper end of the tube is closed by a short rod 24 formed of another neutron-absorbing material, for example, hafnium. The segments 23 may be of the same length or different lengths and have preferably uniform loadings of neutron-absorbing material, although non-uniform loadings may likewise be used. The capsules may be comprised of a stainless steel material.

Figure 4:
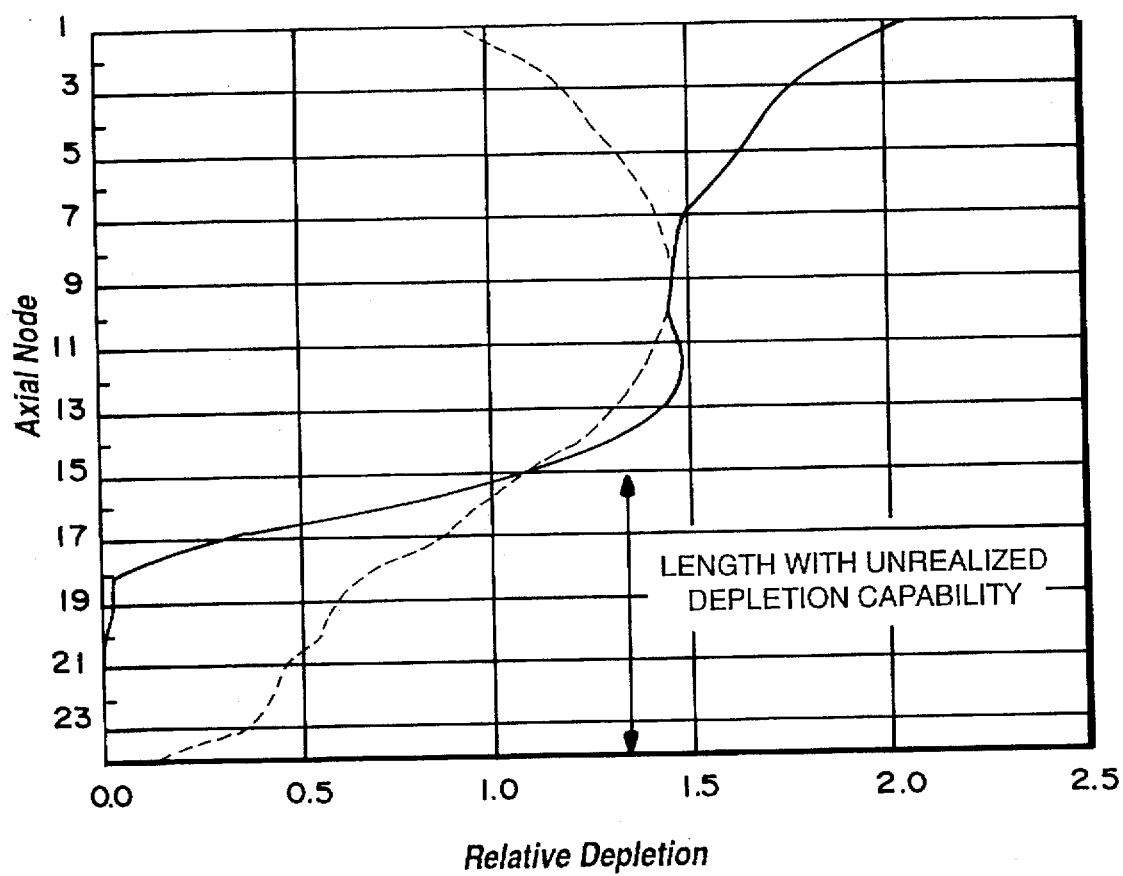
FIG. 4 is a chart plotting depletion profiles of a pair of control rods against axial position.

Referring to FIG. 4, there is illustrated a chart showing relative depletion along the abscissa and the axial node, i.e., axial location of the control rod relative to the core, along the ordinate. Thus, the solid line represents a particular control rod which, after use, shows depletion which is not constant along the axial length of the control rod. It will be seen that the depletion is very high adjacent the upper end of the rod near axial node 1 and its ability to absorb neutrons at that location after use is consequently substantially diminished. Adjacent the lower end of the control rod, however, e.g., at axial nodes 19-24, the depletion is relatively small or zero, and thus substantial capability for neutron absorption remains in the neutron absorbing material of those segments adjacent the lower end of the control rod. The solid line thus depicts the depletion profile for a control rod which has only been partially inserted into the reactor core.

The dashed line in the chart of FIG. 4 illustrates the relative depletion of a further control rod. This latter control rod shows a depletion profile for a control rod which has been inserted deeply into the core and thus has characteristic high depletion near the axial location of peak power of the reactor, i.e., at about node 9. As illustrated in the chart, the control rod depletion profile illustrated by the dashed line indicates that control rod has remaining neutron-absorbing capability below nodes 15 but not as much remaining neutron-absorbing capability as the control rod whose profile is illustrated by the solid line for those same nodes. Thus, it will be seen that the depletion accrued is non-uniform as between the various control rods of the nuclear core. The inherent non-uniformity of depletion characteristics is used to increase the depletion capacity of the control rod in accordance with the present invention.

Figure 3:
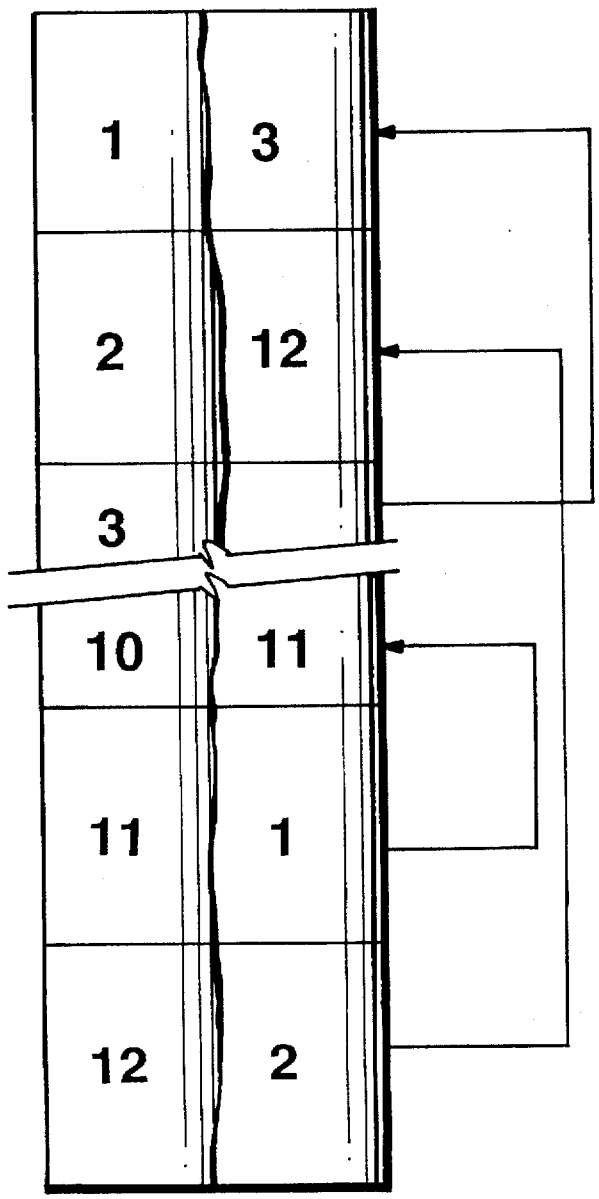
FIG. 3 is a schematic representation of the reordering or rearranging of the segments within the tube.

To accomplish this, the various discrete segments of the neutron-absorbing material of the control rods, during refueling operations, are reordered or rearranged within the control rod to provide different axial depletion profiles. This reordering or rearranging is based on the accrued and projected depletion to maximize the number of cycles for which each control rod can be used. As representative of the present invention, reference is made to FIG. 3, in which the lefthand side of the drawing figure represents the discrete segments of neutron-absorbing material before refueling and which segments have been numbered from top to bottom, for example, by the numerals 1 through 12. The numbers 1 through 12 may represent each capsule or groups of capsules, the number of segments being arbitrary and representative. In the right-hand column in FIG. 3, there is illustrated the segments 1–12 in that control rod tube which have been subjected to depletion but in a reordered or rearrangement thereof after refueling according to the present invention. Thus, for example, where the lowermost segment 12 in the control rod tube has been subjected to very little depletion, i.e., retains substantial capability for neutron absorption, after extended use in the reactor, the segment 12 may be relocated during refueling into a different axial position where the projected or anticipated depletion is high. This is indicated by the arrow which shows the displacement of the segment 12 in the left column in FIG. 3 to a location near the top of the control rod in the right column of FIG. 3. Depending upon the depletion of the other segments during use, the remaining segments can be reordered or rearranged during refueling operations to take advantage of the non-uniform depletion characteristics of these segments. This is schematically indicated by the arrows reordering segments 11 and 3. Depending upon particular usage, sometimes all or only a portion of the segments are rearranged or reordered. By reordering or rearranging these segments, the number of cycles for which the control rod may be used is maximized.

In certain control rods, the neutron-absorbing segments may be of significant length. In that instance, the segments may simply be inverted during refueling operations to locate the portions of the elongated segments having the lowest depletion at elevations in the new control rod requiring higher neutron-absorbing capability. The limit for this inversion is, of course, where one segment comprises the sole single section of neutron-absorbing material in the tube and thus the only possible rearrangement is to invert the single segment. Additionally, it will be appreciated that, during refueling, one or more of the segments containing depleted neutron absorber material can be replaced by fresh segments used in conjunction with other rearranged or reordered segments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of increasing the depletion capacity of a control rod for insertion into the core of a nuclear reactor wherein the control rod has neutron-absorbing material disposed in a plurality of discrete segments at respective discrete locations along the length of the control rod, comprising the steps of:

(a) operating the nuclear reactor with the control rod at least partially inserted into the reactor core in a vertical orientation, (b) after step (a), rearranging the segments of neutron-absorbing material along the control rod and (c) at least partially reinserting the control rod with the rearranged segments into the reactor core with the reinserted control rod of step (c) having the same vertical orientation in the nuclear reactor as in step (a) without inverting the control rod.

2. A method according to claim 1 wherein the step of rearranging includes, after operating the nuclear reactor, relocating at least one segment having a certain depletion to a different location along the control rod where anticipated depletion upon further operation of the nuclear reactor is different than said certain depletion.

3. A method according to claim 1 wherein the step of rearranging includes relocating at least one segment subjected during use in the reactor to a first neutron flux distribution to a second location wherein, during subsequent use, the one segment is subjected in the reactor to a second neutron flux distribution different than the first distribution thereof.

4. A method of increasing the depletion capacity of a control rod for insertion into the core of a nuclear reactor wherein the control rod has neutron-absorbing material disposed in a plurality of discrete segments at respective discrete locations along the length of the control rod, comprising the steps of:

after operating the nuclear reactor with the control rod at least partially inserted into the reactor core in a predetermined directional orientation affording a first axial profile of the depletion, reordering various segments along the control rod to provide a different axial profile of depletion than said first profile upon at least partial reinsertion of the control rod with the reordered segments into the reactor core and with the reinserted control rod in said predetermined directional orientation in the nuclear reactor without inversion of the control rod.

5. A method according to claim 1 wherein the control rod comprises upper and lower ends and in part a plurality of control rod tubes disposed in side-by-side, generally vertically extending orientation relative to one another between said upper and lower ends, said segments of neutron-absorbing material being disposed in said tubes at respective discrete locations therealong, and including the steps of disposing the segments in said tubes between said upper and lower ends to afford a first axial profile of the depletion when operating the nuclear reactor according to step (a), the step (b) of rearranging including reordering the segments in tubes along the control rod between said upper and lower ends thereof and at least partially reinserting the control rod of step (c) with the upper and lower ends of the reinserted control rod oriented in the reactor core as in step (a).

* * * * *